United States Patent [19]
Panizza et al.

[11] Patent Number: 4,632,079
[45] Date of Patent: Dec. 30, 1986

[54] DEVICE FOR AUTOMATICALLY RESTARTING THE ENGINE OF A MOTOR-VEHICLE AFTER SUDDEN BRAKING

[75] Inventors: Ettore Panizza; Ercole Premoli, both of Turin, Italy

[73] Assignee: Fiat Auto S.p.A., Turin, Italy

[21] Appl. No.: 744,438

[22] Filed: Jun. 13, 1985

[30] Foreign Application Priority Data

Jun. 15, 1984 [IT] Italy ................................ 67622 A/84

[51] Int. Cl.⁴ .............................................. F02N 11/08
[52] U.S. Cl. ............................ 123/179 B; 123/179 A; 180/271
[58] Field of Search ........ 123/179 A, 179 B, 179 BG, 123/179 R; 180/271; 290/38 C

[56] References Cited

U.S. PATENT DOCUMENTS 3,229,792 1/1966 Hock ................................. 123/179 A
3,715,004 2/1973 Pasek et al. ......................... 180/271
3,715,005 2/1973 Byram et al. ........................ 180/271
4,122,355 10/1978 Turbitt .......................... 123/179 BG Primary Examiner—Andrew M. Dolinar
Attorney, Agent, or Firm—Sughrue, Mion, Zinn, Macpeak & Seas

[57] ABSTRACT

The device comprises electrical speed sensors for providing electrical signals indicative of the speed of rotation of at least one driven wheel of the motor vehicle, the speed of rotation of the engine, and the speed of the motor vehicle, a sensor for indicating the condition of braking of the motor vehicle, and an electronic monitoring and control unit connected thereto. The electronic monitoring and control unit is arranged to actuate the electric starter motor of the internal combustion engine when, as a result of "panic" braking, the driven wheels become locked, the engine stalls while the vehicle is still in motion, and the braking force has been at least partially reduced. Thus the driven wheels are turned again and, consequently, the stability and correct handling of the motor vehicle are regained.

7 Claims, 1 Drawing Figure

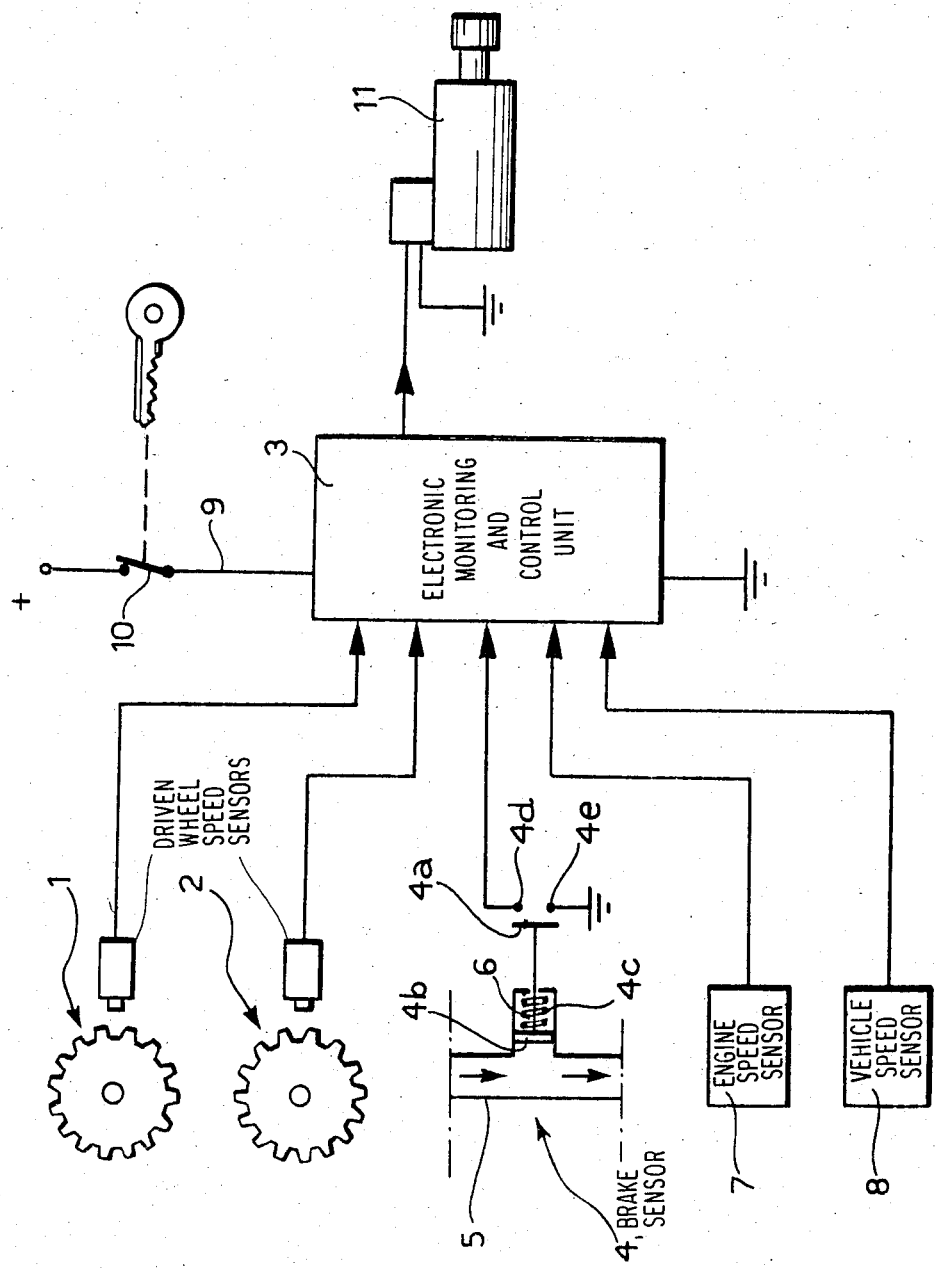

DEVICE FOR AUTOMATICALLY RESTARTING THE ENGINE OF A MOTOR-VEHICLE AFTER SUDDEN BRAKING

The present invention relates, in general, to a device for controlling the operation of the internal combustion engine of a motor vehicle.

When the driver of a motor vehicle brakes suddenly ("panic braking") under poor road-holding conditions, the engine of the motor vehicle may stall because of a temporary, albeit brief, locking of the driven wheels. This constitutes a considerable problem. In fact, under poor road-holding conditions, the stalled engine can prevent the driven wheels from being turned again, even when the brakes are released, since the opposing torque presented by the stalled engine may exceed the torque transmitted to the driven wheels from the ground.

This circumstance (failure of the driven wheels to turn again) is particularly dangerous in the case of rear-wheel-drive vehicles since it gives rise to a near total loss of lateral stability and, consequently, to uncontrollable spin and skidding.

In the case of vehicles with front-wheel drive, the effect of the locking of the driven wheels persisting even when the brakes are released is to make any proper handling of the car practically impossible.

The object of the present invention is, therefore, to produce a device capable of remedying the problems described above.

This object is achieved according to the invention by means of a device from controlling the operation of the internal combustion engine of a motor vehicle, the main characteristic of which resides in the fact that it comprises:

first electrical speed sensor means for association with at least one of the driven wheels of the motor vehicle, and for providing electrical signals indicative of the speed of rotation of at least this wheel;

second electrical speed sensor means for providing electrical signals indicative of the speed of rotation of the engine;

third electrical speed sensor means for providing electrical signals indicative of the speed of the motor vehicle;

means for indicating the condition of braking of the motor vehicle, and an electronic monitoring and control unit connected to the first, second and third speed sensor means and to the indicator means, and arranged to output a command signal usable to cause the actuation of the starter motor of the internal combustion engine when the signals output by the indicator means and the first and second speed sensor means indicate that, after the brakes have been applied, at least the driven wheel monitored has become locked, the engine has stalled, the vehicle is still in motion and the braking force has been at least partially reduced, so as to ensure that the driven wheels may be turned again and that, consequently, the stability and correct handling of the motor vehicle may be regained.

Further characteristics and advantages of the device according to the invention will become apparent from the detailed description that follows, provided with reference to the appended drawing, which illustrates by way of non-limiting example, one embodiment of the device according to the invention.

With reference to the drawing a device according to the invention comprises a pair of speed sensors 1,2 of the phonic-wheel type, each associated with a respective driven wheel of a motor vehicle, and being connected to respective inputs of an electronic monitoring and control unit generally indicated 3. Reference numeral 4 indicates a sensor for sensing the pressure in the hydraulic braking system of the motor vehicle. In the embodiment illustrated, the sensor comprises a movable electrical contact 4a mounted on a piston 4b movable in a pipe 4c branching from a pipe 5 forming part of the hydraulic braking circuit of the motor vehicle. A biassing spring 6 acting on the piston 4b serves to maintain the contact 4a spaced from a pair of fixed contacts 4d, 4e of which the first is connected to an input of the monitoring and control unit 3 and the second is connected to earth. When the braking system is actuated, the resulting braking force causes the piston 4b to move against the action of the spring 6 and to close the movable contact 4a against the fixed contacts 4d and 4e.

In the case of dual circuit braking systems, the sensor 4 is connected in the braking circuit for the driven wheels.

The monitoring and control unit 3 is also connected to an electrical sensor 7 for detecting the rate of rotation of the internal combustion engine, and to a further sensor 8, (for example, also of the phonic-wheel type, associated with a non-driven wheel) for outputting electrical signals indicative of the speed of the vehicle. The electronic monitoring and control unit 3 is supplied by a power source (the battery of the motor vehicle) through a connecting cable 9 in which a circuit breaker 10 controlled by the ignition and starter switch of the motor vehicle is connected. The monitoring and control unit 3 has its output connected to the supply circuit for the electric starter motor 11 of the internal combustion engine.

In operation, when the internal combustion engine stalls as a result of the locking of the driven wheels following sudden braking under poor road-holding conditions, the monitoring and control unit 3 detects this occurrence from the information signals originating from the sensors described above. As soon as the brakes are released (a condition signalled to the monitoring and control unit 3 by the sensor 4) the monitoring and control unit 3 causes the electric starter motor 11 to be actuated for the time required to restart the internal combustion engine with the ensuing turning of the driven wheels. Thus, conditions of lateral stability and of correct control of the vehicle are regained.

The sensor 8 enables the monitoring and control unit 3 to operate when the motor vehicle is in motion.

The device according to the invention may conveniently be used either in motor vehicles fitted with standard braking systems or in motor vehicles equipped with 37 antiskid" systems.

In a simplified variant, instead of a pair of speed sensors, one associated with each of the driven wheels, it is possible to use a single sensor associated with only one of the driven wheels.

What is claimed is:

1. A device for controlling the operation of an internal combustion engine of a motor vehicle, comprising;

first electrical speed sensor means for association with at least one driven wheel of the motor vehicle and for providing electrical signals indicative of the speed of rotation of the wheel;

second electrical speed sensor means for providing electrical signals indicative of the speed of rotation of the engine;

third electrical speed sensor means for providing electrical signals indicative of the speed of the vehicle;

indicator means for indicating the condition of braking of a vehicle, and an electronic monitoring and control unit connected to the said first, second and third speed sensor means and to the indicator means, and arranged to output a command signal usable to cause the actuation of a starter motor for the internal combustion engine when the signals provided by the said first, second and third speed sensor means and by the indicator means indicate that, following braking of the motor vehicle, at least the driven wheel monitored has become locked, the internal combustion engine has stalled, the vehicle is still in motion, and the braking force has been at least partially reduced, so as to cause the driven wheels to be turned again and, consequently, the stability and correct handling of the motor vehicle to be regained.

2. A device according to claim 1, wherein the said first speed sensor means include a pair of speed sensors each for use in association with a respective driven wheel of the motor vehicle, and in that the said electronic monitoring and control unit is arranged to output the said command signal only when the signals provided by the said sensors indicate that the speed of rotation of each of the driven wheels is substantially nil.

3. A device according to claim 2, wherein the said first and third speed sensor means are of the phonic-wheel type.

4. A device according to claim 2, in particular for vehicles with a hydraulic braking circuit, wherein the said indicator means include a threshold pressure sensor incorporated in the hydraulic braking circuit.

5. A device according to claim 4, for motor vehicles fitted with a dual hydraulic braking circuit, wherein the said pressure sensor is incorporated in the dual hydraulic braking circuit of the driven wheels.

6. A device according to claim 1 wherein the said third speed sensor means includes at least one speed sensor for association with a non-driven wheel of the motor vehicle.

7. A device according to claim 1 wherein the said electronic monitoring and control unit is connected to a power supply through a circuit breaker controlled by means of an ignition and starter switch of the motor vehicle engine.

* * * * *